United States Patent
Bellisio

[11] 3,807,138
[45] Apr. 30, 1974

[54] RECOVERY AND PURIFICATION OF VINYL CHLORIDE VENTING FROM PVC REACTORS

[75] Inventor: Arthur A. Bellisio, Huntington Station, N.Y.

[73] Assignee: GAF Corporation, New York, N.Y.

[22] Filed: Apr. 24, 1972

[21] Appl. No.: 246,935

[52] U.S. Cl. .................................... 55/71, 55/73
[51] Int. Cl. ........................................ B01d 53/14
[58] Field of Search ......... 55/32, 68, 71, 73, 63–64; 260/654 R, 654 S

[56] References Cited
UNITED STATES PATENTS
3,733,780   5/1973   Bellisio et al. ..................... 55/73
FOREIGN PATENTS OR APPLICATIONS
187,008   12/1966   U.S.S.R.

Primary Examiner—Charles N. Hart
Attorney, Agent, or Firm—Walter C. Kehm; Samson B. Leavitt

[57] ABSTRACT

Vented vapors and inert purge gas from a polyvinyl chloride reactor are contacted with an N-alkyl lactam liquid solvent in an absorption zone maintained at a liquid temperature of about 20°C–40°C to remove a substantial portion of the vinyl chloride content of the gaseous mixture of said vented vapors and purge gas. The N-alkyl lactam contains water in an amount of from about 2% to about 10% by weight. The gaseous mixture introduced into the absorption zone is at a pressure of from about 25 to about 100 psig, the temperature of the gas being from about 10°C to about 40°C. Rich lactam solvent having the recovered vinyl chloride absorbed therein is passed to a stripper zone wherein reboiler vinyl chloride vapors strip therefrom vapor impurities removed from the gaseous mixture for recycle to the absorption zone. A stripper bottoms liquid stream is passed to a distillation zone wherein the vinyl chloride is stripped from the stripper bottoms and recovered as an essentially pure vinyl chloride free of the impurities vented therewith from the polyvinyl chloride reactor and the associated purge gas. N-methyl pyrrolidone is a preferred N-alkyl lactam solvent for said recovery and purification of vinyl chloride vapors.

30 Claims, 3 Drawing Figures

VINYL CHLORIDE RECOVERY SECTION

IMPURITIES STRIPPING SECTION

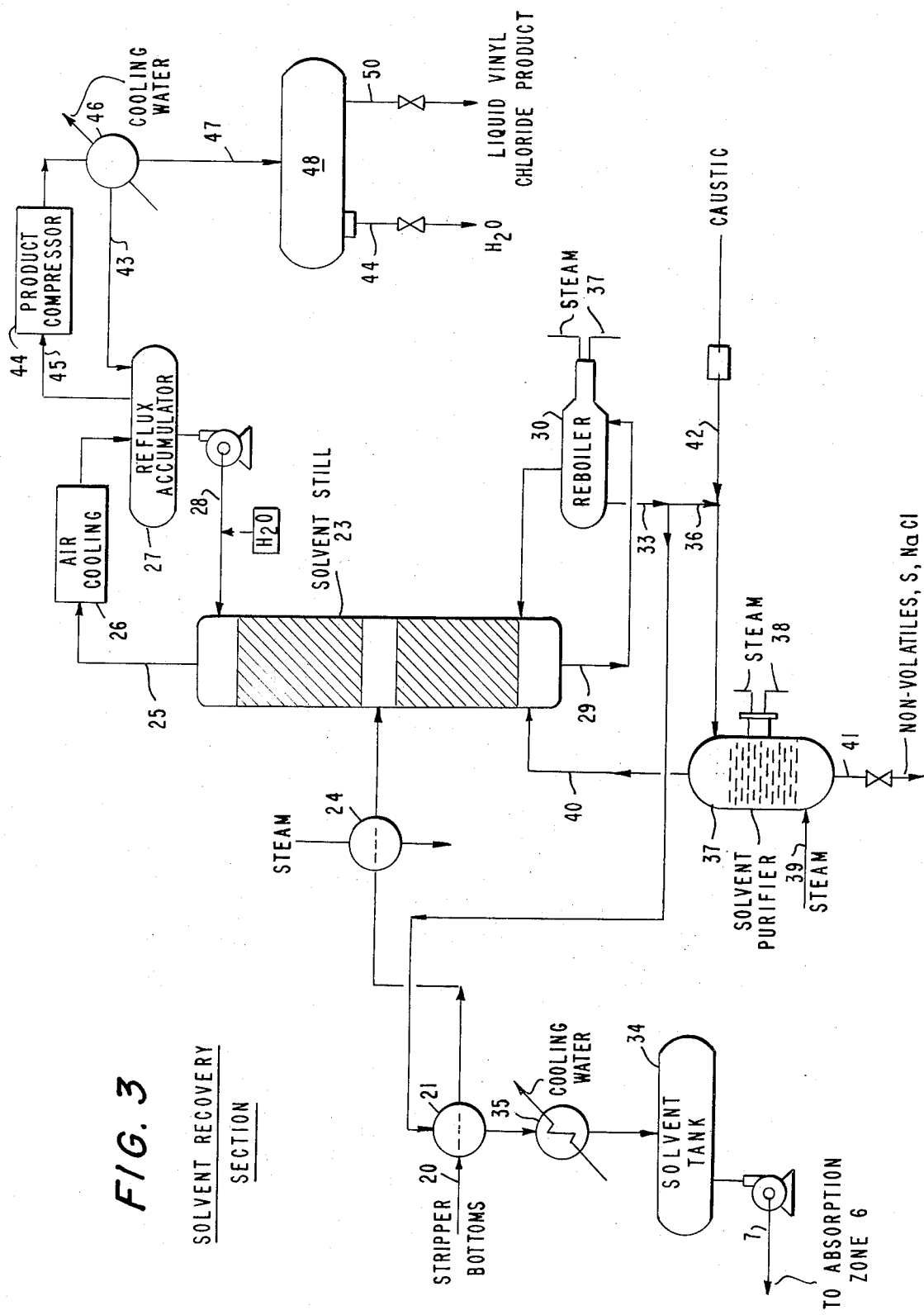

RECOVERY AND PURIFICATION OF VINYL CHLORIDE VENTING FROM PVC REACTORS

BACKGROUND OF THE INVENTION

1. Field of the Invention

The present invention relates to the recovery of the polyvinyl chloride vapors vented from polyvinyl chloride reactors. More particularly, it relates to the recovery and purification of said vinyl chloride vapors vented from polyvinyl chloride reactors and accumulated with associated purge gases.

2. Description of the Prior Art

In a typical polyvinyl chloride plant, un-reacted vinyl chloride vapors are present in the reactor void space, e.g., about 20% of the reactor capacity, said vapors being commonly at a pressure of about 100 psig and temperatures on the order of 120°F–140°F. As a typical plant will have a number of such polyvinyl chloride reactors, each coming off service on a regular schedule, such as every 8 hours, a relatively large number of reactor changes per day will occur, commonly at uniform intervals of time. As each reactor comes off service, the un-reacted vinyl chloride vapors therein are vented from the reactor, as to an atmospheric gas-holder by release of the gas pressure in the reactor. The reactor is then purged with either nitrogen or some other inert gas, e.g., flue gas, to assure that all of the vinyl chloride vapors are removed from the reactor. The purge gas is also passed to said gas-holder.

The gaseous mixture thus obtained in the gas-holder comprises vinyl chloride vapors, together with the inert purge gas and minor amounts of various gaseous impurities vented from the reactor. The impurities present in the gaseous mixture in the gas-holder typically include acetylene, butadiene, methyl chloride, acetaldehyde, hydrogen chloride, sulfur and non-volatile material. The recovery and purification of the vinyl chloride present in the gaseous mixture thus obtained is, of course, highly desirable in the overall economy of such plant. While liquid solvents for the various components of the gaseous mixture can be determined, the recovery and purification of the vinyl chloride from such gaseous mixtures are particularly difficult in the absence of a selective solvent facilitating the desired recovery and purification of the vinyl chloride present in such gaseous mixtures. For example, the volatility of vinyl chloride is intermediate between that of methyl chloride as a more volatile material, and butadiene as a less volatile material, with the desired purification of vinyl chloride therefrom being made particularly difficult in that the methyl chloride, butadiene and other impurities are all present in the gaseous mixture in only trace quantities. A selective solvent permitting the desired separation of vinyl chloride from the inert purge gas and associated gaseous impurities removed from polyvinyl chloride reactors is, therefore, highly desirable in the art.

In Russian Pat. No. 187,008, received in the Scientific Library on Feb. 13, 1967, N-methyl pyrrolidone is disclosed for extracting vinyl chloride from a gaseous mixture. In particular, the extraction of vinyl chloride and acetylene from a gaseous mixture with inert gases, e.g., nitrogen, is shown using N-methyl pyrrolidone containing no more than 0.5% water as an absorbent at a temperature of +10°C to −20°C. This method is said to differ from a known technique for absorbing vinyl chloride from such mixture using ethyl cellulose at −15°C in that the N-methyl pyrrolidone is non-toxic and increases the efficiency of the extraction.

There remains, however, a need for a method of recovering vinyl chloride from the gaseous mixture vented and purged from polyvinyl chloride reactors. As indicated above, this method should advantageously permit the vinyl chloride vapors from said mixture to be not only recovered, but to be purified by separation from the inert purge gas and from a substantial portion of the vapor impurities accompanying the vinyl chloride from the polyvinyl chloride reactors.

It is an object of the present invention, therefore, to provide an improved method for the recovery of vinyl chloride from the gaseous mixture vented and purged from polyvinyl chloride reactors.

It is another object of the invention to provide a method for the recovery and purification of vinyl chloride vapors passing from polyvinyl chloride reactors.

It is a further object to provide a method for selectively recovering vinyl chloride vapors from the inert purge gas and the impurities accompanying said vinyl chloride removed from reactors upon withdrawal of said reactors from polyvinyl chloride production service.

With these and other objects in mind, the present invention is hereinafter disclosed, the novel features of the invention being particularly pointed out in the appended claims.

SUMMARY OF THE INVENTION

Vinyl chloride vapors are selectively recovered from a gaseous mixture, as from the gases vented and purged from a polyvinyl reactor, by contact of such a vinyl chloride-containing gas stream with an N-alkyl lactam liquid solvent in an absorption zone maintained at a liquid temperature of from about 20°C to about 40°C, the lactam solvent containing generally from about 2% to about 10% by weight water based on the total weight of said liquid solvent. The gas stream to be treated is introduced into the absorption zone at a pressure of from about 25 psig to about 100 psig, the temperature of the gas thus being introduced being from about 10°C to about 40°C. The treated gas stream exhausted from the absorption zone will have a substantial portion of its vinyl chloride content selectively removed therefrom. The lactam solvent having vinyl chloride vapors absorbed therein is passed from the absorption zone to a distillation zone wherein the vinyl chloride vapors are stripped from the lactam solvent, which can then be recycled to the absorption zone for contact with additional quantities of the vinyl chloride-containing gas to be treated. Condensed vinyl chloride vapors from the distillation zone can be recovered as an essentially pure, liquid vinyl chloride product. The lactam employed is preferably an N-lower alkyl pyrrolidone, i.e., N-methyl pyrrolidone.

In the treatment of a vinyl chloride-containing gas stream resulting from the venting and purging of polyvinyl chloride reactors, the treated gas stream exhausted from the absorption zone contains the inert purge gas employed and a substantial portion of the various vapor impurities removed from the polyvinyl chloride reactor with the vinyl chloride vapors to be recovered. The lactam solvent having vinyl chloride absorbed therein is passed to a stripping zone wherein the lactam is contacted with reboiler vinyl chloride vapors so as to strip absorbed vapor impurities from the solvent. The vapor impurities thus stripped from the lactam, accompanied by a portion of the vinyl chloride content of the lactam fed to the stripping zone are recycled to the absorption zone, the vapor impurities thus ultimately being withdrawn from the system in the gas stream exhausted from the absorption zone. A stripper bottoms liquid stream is passed from the stripping zone to a distillation zone wherein the vinyl chloride to be recovered is stripped from the lactam solvent, which is recycled to the absorption zone. In order to preclude the gradual accumulation of non-volatile materials, hydrogen chloride and/or sulfur in the lactam solvent stream, a portion thereof is passed to a solvent purification zone wherein the lactam solvent is steam stripped for return to the distillation zone. The non-volatile material, HCl and sulfur contained in the side stream are drained from the purification zone. In the overall process of the present invention, the vinyl chloride thus recovered and purified can be obtained as an essentially pure, liquid vinyl chloride condensate having a vinyl chloride content on the order of about 99% by weight. The treated gas exhausted from the absorption zone comprises the inert purge gas and a substantial portion of the vaporous impurities present in the vinyl chloride-containing gas stream being treated, the vinyl chloride present in this exhausted stream generally being not more than about 5% by weight of the total vinyl chloride content of the gas stream being treated.

BRIEF DESCRIPTION OF THE DRAWINGS

The invention is hereinafter described in further detail with reference to the accompanying drawings in which:

FIG. 3 is a flow diagram illustrating an embodiment of the lactam solvent recovery section of the overall method of the present invention.

DETAILED DESCRIPTION OF THE INVENTION

Figure 1:
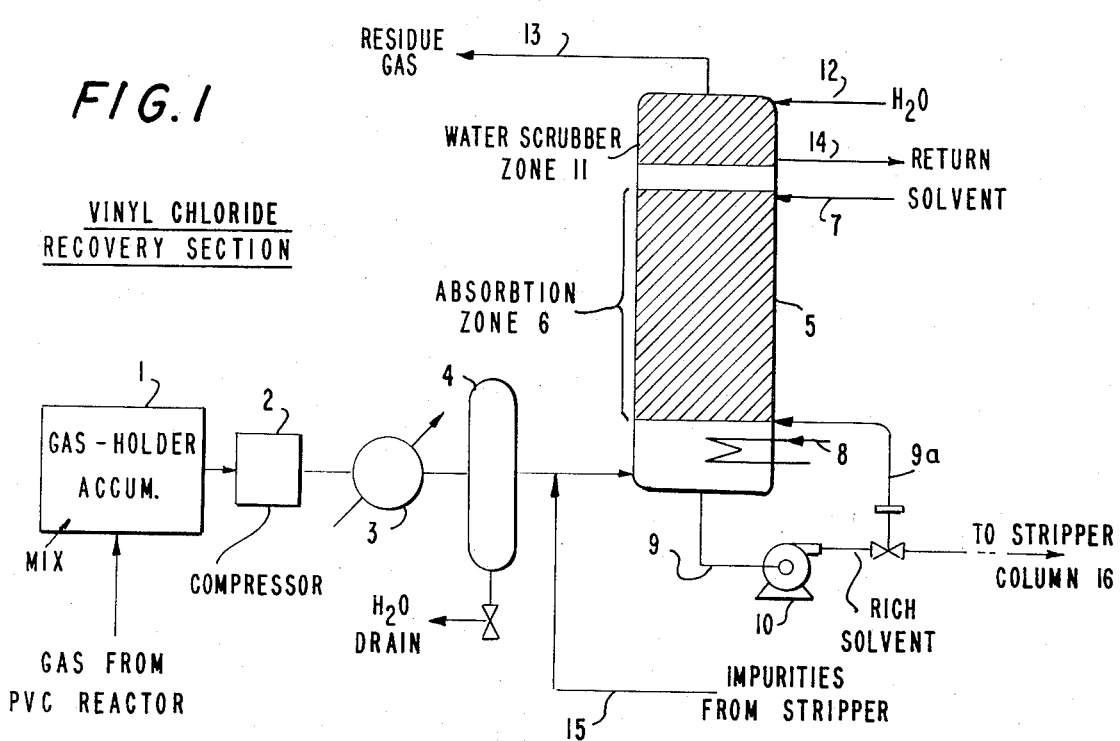
FIG. 1 is a flow diagram illustrating the vinyl chloride recovery section of an embodiment of the overall method of the present invention.

In the practice of the present invention, vinyl chloride is recovered from a gaseous mixture comprising vented vapors and inert purge gas removed from polyvinyl chloride reactors. As indicated above, vented vapors together with nitrogen or another purge gas, e.g., flue gas, can be passed to an atmospheric gas-holder prior to treatment by contact with an N-alkyl lactam solvent in accordance with the vinyl chloride recovery and purification method of the present invention. A typical composition of the gaseous mixture in such a gas-holder upon venting and purging of polyvinyl chloride reactors is as set forth in Table I as follows:

TABLE I

| Component | Concentration (Mole %) | ppm* | Lb. Moles/Day |
|---|---|---|---|
| Inert gases ($N_2$ flue gas) | 49.4% | | 97.654 |
| Acetylene | | 0.2 ppm | 0.00004 |
| Butadiene | | 3.5 ppm | 0.0007 |
| Methyl chloride | | 35.4 ppm | 0.007 |
| Vinyl Chloride | 50.5% | | 100.0 |
| Acetaldehyde | | 0.2 ppm | 0.00004 |
| Hydrogen chloride | | 1.0 ppm | 0.0002 |
| Sulfur | | 0.5 ppm | 0.0001 |
| Non-volatile | | 50.6 ppm | 0.01 |
| Totals | 100.0% | | 197.67 |
| Water | | | 2.02 |

*parts per million, by volume

A vinyl chloride-containing gaseous mixture, such as that indicated above, is passed through an absorption zone for contact with an N-alkyl lactam liquid solvent in order to selectively remove and purify the vinyl chloride component thereof. The N-alkyl lactam selective solvent employed is preferably an N-alkyl pyrrolidone or piperidone, generally having from about one to about 16 carbon atoms in the alkyl group, which includes N-cycloalkyl groups. Most preferred are the N-lower alkyl groups of one to six carbon atoms, including N-lower cycloalkyl groups, such as the N-cyclohexyl group. Of said N-lower alkyl pyrrolidones for use in the present invention, the most preferred lactam solvent comprises N-methyl pyrrolidone. Illustrative of other liquid N-lower alkyl lactams suitable for use as solvents in the practice of the present invention include, but are not necessarily limited to the following: N-ethyl pyrrolidone, N-propyl pyrrolidone, N-isopropyl pyrrolidone, N-p-butyl pyrrolidone, N-n-butyl pyrrolidone, N-n-hexyl pyrrolidone, N-cyclohexyl pyrrolidone, N-n-octyl pyrrolidone, N-isooctyl pyrrolidone, N-n-decyl pyrrolidone, N-dodecyl pyrrolidone, N-dedecyl pyrrolidone, N-petradecyl pyrrolidone, N-hexadecyl pyrrolidone, N-methyl piperidone, N-ethyl piperidone, N-propyl piperidone, N-isopropyl piperidone, N-p-butyl piperidone, N-n-butyl piperidone, N-n-hexyl piperidone, N-n-octyl piperidone, N-isooctyl piperidone, N-n-decyl piperidone, N-undecyl piperidone, N-dodecyl piperidone, N-tetradecyl piperidone, N-hexadecyl piperidone, and the like.

The N-alkyl pyrrolidones and piperidones employed in accordance with the process of the present invention are lactams of the gamma-and delta-amino acid derived from butyric acid, valeric acid and caprylic acid. Since such substances are cyclic acid amides, they are neutral and therefore act in accordance with the present invention as physically dissolving absorbents, such liquid lactams having been found to have an affinity for the selective absorption of vinyl chloride vapors from the gaseous mixture obtained upon venting and purging polyvinyl chloride reactors removed from production operation service.

The gaseous mixture from which vinyl chloride vapors are to be recovered and purified will ordinarily be a wet mixture from which excess water is removed as hereinafter indicated. As the liquid lactam solvents are hereinabove set forth can tolerate the presence of water in the system without adverse effect on the desired vinyl chloride recovery, it is not necessary, therefore, to assure that the gaseous mixture is in a dry condition upon contact with the liquid lactam or that the lactam be maintained in an essentially anhydrous form. As the presence of a small amount of water in the liquid lactam composition serves to facilitate the distillation of the rich lactam for recovery of the vinyl chloride product and regeneration of the lactam, the method of the present invention is advantageously carried out by contacting the gaseous mixture to be treated with a water-containing lactam solvent composition. The lactam composition will thus advantageously contain water in an amount generally within the range of from about 2% to about 10% by weight, although water in amounts outside this range can also be employed. The water content of the liquid lactam composition is preferably about 5% by weight.

Referring to the drawings, vinyl chloride-containing gaseous mixtures from polyvinyl chloride reactors, not shown, are vented to an atmospheric gas-holder accumulator 1 in the vinyl chloride recovery section of the overall operation, as shown in FIG. 1. Inert purge gas employed to assure that all of the vinyl chloride vapors are removed from the reactors is likewise passed to said gas-holder 1 in which a propeller mixer may be employed to produce a gaseous mixture of uniform composition. A vinyl chloride-containing gas stream to be treated is passed from gas-holder 1 to compressor unit 2 in order to bring the gas stream up to a suitable pressure for the efficient absorption of vinyl chloride vapors therefrom and to reduce the water vapor content thereof. The gas stream will generally be compressed to a pressure of from about 25 psig to about 100 psig. The gas stream from compressor 2 is passed through a suitable heat exchange unit 3 in order to reduce the temperature of the gas stream from on the order of about 90°C–110°C to from about 10°C to about 40°C. The thus pressurized and cooled gas stream passes into water knock-out tank 4 from which liquid water is drained prior to the passage of the gas stream into absorption zone 6 of column 5 for ascending passage therethrough in counter-current contact with a descending stream of liquid lactam solvent composition introduced into the upper portion of said absorption zone 6 through line 7. Cooling water may be circulated through the lower portion of column 5, as illustrated by line 8, for indirect heat exchange to assure that absorption zone 6 is maintained at a temperature within the desired range. A rich lactam solvent composition stream having vinyl chloride absorbed therein is withdrawn from the bottom of column 5 through line 9 for passage by means of pump 10 to the impurity stripper section shown in FIG. 2. A side stream 9a of the rich solvent stream in line 9 may be recycled to the lower portion of absorption zone 6 for maintaining the desired temperature control in the absorption zone.

The treated gas stream emerging from absorption zone 6 of column 5 passes upwardly directly into water scrubber zone 11 of said column 5. In said zone 11, the ascending stream of gas passes in counter-current contact with a descending stream of water introduced into the upper portion of said scrubber zone 11 through line 12. Upon contact with the ascending stream of gas, the water in said scrubber zone 11 serves to effectively remove from the gas stream essentially all of the lactam that is either vaporized or entrained in the gas stream leaving absorption zone 6 of column 5. The treated residue gas exhausted from column 5 through line 13, therefore, not only has a substantial portion of its vinyl chloride content removed therefrom, but is also substantially free of vaporized or entrained lactam solvent. This latter feature is highly significant from a practical operating viewpoint, in that any appreciable loss of the lactam solvent in the gas stream exhausted from column 5 would constitute a major operating disadvantage adversely effecting the overall economic evaluation of the vinyl chloride recovery method of the present invention.

In FIG. 1, water having recovered lactam therein is shown being withdrawn from scrubber zone 11 through line 14. It will be understood that, in the practice of the invention, this stream will thereafter be treated to recover the lactam content thereof for subsequent use in the absorption of vinyl chloride from additional quantities of the gaseous mixture vented from polyvinyl chloride reactors. This subsequent lactam recovery operation can be accomplished in a number of ways as will be readily appreciated by those skilled in the art. In one embodiment of the overall method of the invention, the lactam-containing water stream from said scrubber zone 11 can be passed to the solvent recovery section shown in FIG. 3 for recovery of the lactam together with the lactam recovery operation illustrated therein, in which the rich lactam stream removed from column 5 through line 9 is ultimately processed to regenerate the lactam solvent and to recover the desired vinyl chloride product. In this embodiment, the lactam recovered from the water stream in line 14 can be recycled to absorption zone 6 together with the regenerated lactam as indicated in said FIG. 3. In another embodiment of the invention, the descending stream of water in said water scrubber zone 11 can be passed directly into absorption zone 6 of column 5 rather than being removed as a separate stream through line 14 as indicated above. The passing of the water stream having recovered lactam solvent dissolved therein directly into the absorption zone, which is of particular interest in relatively small scale operations, is permissible because of the ability of the lactam to tolerate the presence of water without adverse effect on its vinyl chloride stripping ability as noted above. As the amount of water necessary to assure the desired recovery of vaporized and entrained lactam in the treated gas stream is relatively small, the passing of the water stream from scrubber zone 11 directly into absorption zone 6 of column 5 is permissible without departing from the general range of water content heretofore indicated as being advantageous in the vinyl chloride recovery operation of the present invention.

Figure 2:
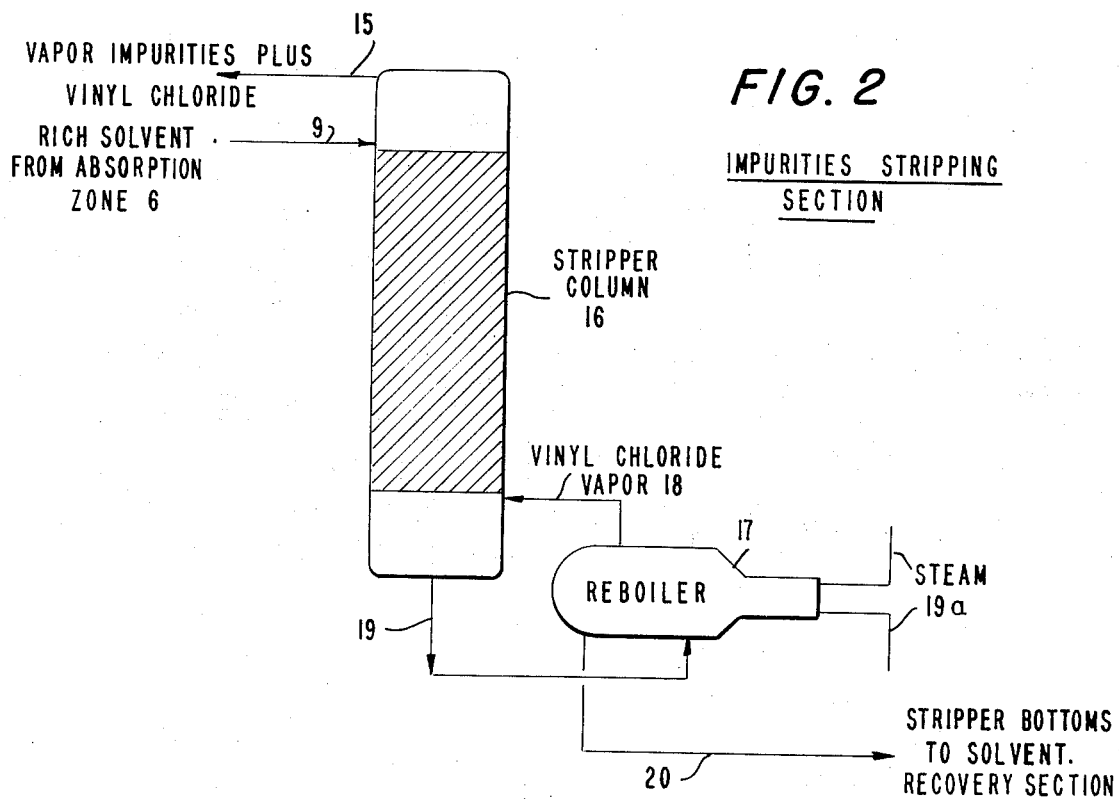
FIG. 2 represents a flow diagram illustrating an embodiment of the impurities stripping zone employed to purify the vinyl chloride recovered in the overall method of the present invention.

As will hereinafter be disclosed in further detail, the treated gas exhausted from column 5 through line 13 will contain essentially all of the purge gas and a substantial proportion of the vaporous impurities contained in the gaseous mixture passed from gas-holder accumulator 1, but will have essentially all of the vinyl chloride content of said gaseous mixture stripped therefrom. The rich lactam solvent-water stream removed from the bottom of column 5 will thus have essentially all, e.g., generally about 95% or more of the vinyl chloride vapors from the gaseous mixture absorbed therein. The rich lactam composition stream will also contain any acetaldehyde impurities present in the gaseous mixture and any hydrogen chloride, particularly since said hydrogen chloride is very soluble in water. Any sulfur and non-volatile material present in said gaseous mixture will also be withdrawn from the absorption zone in said rich lactam composition stream. Although most of the inert purge gas, and the acetylene, butadiene and methyl chloride vapor impurities from the gaseous mixture will not be absorbed in the lactam composition, said rich lactam stream removed from the absorption zone will nevertheless contain a minor proportion of such impurities. Such vapor impurities present in the rich solvent stream are stripped from the rich solvent in the vapor impurities stripper section of the overall operation as shown in FIG. 2 hereof. The vapor impurities thus stripped from the rich solvent liquid stream, as hereinafter disclosed in further detail with reference to FIG. 2, are recycled through line 15 for passage, together with additional quantities of the gaseous mixture from accumulator 1, into the bottom portion of column 5 for upward passage therein. In this manner, a very substantial portion of the vaporous impurities present in the gaseous mixture being treated are ultimately discharged from the system in the treated gas stream exhausted from column 5 to line 13.

Referring now to FIG. 2 of the drawing, the rich lactam solvent liquid stream in line 9 is passed to stripping column 16 having a reboiler 17. In said stripping column 16, the rich lactam solvent stream passes downwardly in counter-current contact with an ascending stream of reboiling vapors entering column 16 from reboiler 17 through line 18. Steam for the operation of reboiler 17 is furnished to line 19a. The stripper reboiler vapors are essentially vinyl chloride, with the vapors being essentially free of acetylene, butadiene and methyl chloride. Most of the lighter impurities present in the rich lactam solvent stream in column 16 are stripped therefrom, with the vapor impurities stripped from the rich solvent together with recycle vinyl chloride vapors passing from said column 16 through line 15 for recycle to absorption zone 6 as indicated above. Very little of the vinyl chloride is stripped from the rich solvent in said column 16 since the stripping agent is itself vinyl chloride. Stripper bottoms from column 16 are passed through line 19 to said reboiler 17, from which a liquid stream is withdrawn through line 20. This stripper bottoms liquid stream from reboiler 17 comprises the lactam solvent having the recovered vinyl chloride absorbed therein, but with essentially all of the vaporous impurities at present in the gaseous mixture accumulated in gasholder 1 removed therefrom. Also present in the liquid stream in line 20 are any acetaldehyde, sulfur and non-volatile materials accompanying the gaseous mixture vented and purged from the polyvinyl chloride reactors.

As shown in FIG. 3 of the drawings relating to the solvent recovery section of the overall operation of the present invention, the stripper bottoms liquid stream in line 20 is advantageously passed through heat exchanger 21 to recover a portion of the heat present in regenerated lactam solvent being recycled to the absorption zone of column 5. The stripper bottoms are passed from said heat exchanger 21 through line 22 to lactam solvent recovery still 23, said stripper bottoms liquid stream being pre-heated, as with steam, in heat exchange unit 24. Thus, the stripper bottoms pass into still 23 as a pre-heated and partially vaporized rich lactam stream. In still 23, the stripper bottoms are distilled under reflux conditions, to separate the vinyl chloride content thereof from the liquid lactam solvent. Vapors comprising vinyl chloride and water are withdrawn from still 23 through line 25 for passage to reflux condenser 26 wherein the vapors are cooled, as by air-cooling, to condense at least a portion of the water content thereof, the partially condensed stream thereafter passing to reflux accumulator 27 from which a liquid stream comprising essentially water is recycled back to still 23 as reflux through line 28. A liquid lactam stream is withdrawn from the bottom portion of still 23 through line 29 and is passed to reboiler 30 and operated by steam in line 31. Reboiling vapors are returned to still 23 from reboiler 30 through line 32. Liquid lactam solvent is removed from reboiler 30 through line 33 for passage to lactam storage tank 34 for recycle to absorption zone 6 of column 5 as hereinabove disclosed. As previously indicated, the liquid lactam solvent stream in line 33 is advantageously passed through heat exchanger 21 to utilize a portion of its heat content for preheating the stripper-bottoms being passed to still 23. If desired, the liquid lactam stream in line 33 can also be passed through a second heat exchange unit 35 for further cooling, as by indirect heat exchange with cooling water, prior to entry into storage tank 34.

To the extent that the liquid lactam stream withdrawn from reboiler 30 through line 33 contains sulfur, hydrogen chloride, non-volatiles and heavy ends due to the presence of such materials in the gas stream being treated by the liquid lactam solvent, it will be appreciated that a gradual accumulation of such materials will occur, eventually adversely effecting the efficiency of the overall operation or the purification or replacement of the lactam solvent employed. In one embodiment of the invntion, such a gradual accumulation is precluded by passing a relatively small side stream of the liquid lactam in line 33 through line 36 to solvent purifier 37 heated by steam 38, wherein the liquid lactam solvent having said non-volatiles present therein is steam-stripped, as by steam entering purifier 37 through line 39. The thus steam-stripped lactam solvent is passed from purifier 37 through line 40 back to solvent still 23 wherein it is incorporated back into the system free of the sulfur, non-volatiles, hydrogen chloride and other undesired impurities accompanying said lactam solvent as fed through line 36 to solvent purifier 37. Non-volatile materials, e.g., heavy ends, sulfur, small amounts of scale, rust, and the like can be removed from the system conveniently by draining the liquid content of purifier 37 periodically through drain line 41. Low pH in the solvent can readily be controlled by adding a very small amount of caustic, as in the form of sodium hydroxide, to said side stream 36 through line 42, thus limiting the HCl to a non-corrosive minimum. Purification of the lactam solvent in the manner hereinabove set forth can, as indicated, be accomplished by thus treating only a small side stream from the liquid lactam stream from reboiler 30 passing through line 33 to lactam storage tank 34. This side stream can, for example, conveniently comprise only about 5% to about 10% by weight of the total lactam solvent stream withdrawn from said reboiler 30 in line 33. Regenerated lactam solvent in tank 34 is passed, by means of recirculation pump 43 back to the upper portion of absorption zone 6 of column 5 through line 7 as shown in FIG. 1.

Non-condensed vinyl chloride vapors pass from reflux accumulator 27 to product compressor 44 through line 45. From said compressor 44, the vinyl chloride vapors pass to product condenser 46 wherein said vapors are cooled sufficiently to achieve the desired condensation thereof, the condensate comprising liquid vinyl chloride and water passing through line 47 to product storage container 48, from which water may be drained through line 49. Essentially pure liquid vinyl chloride product can be removed from said storage container 48 through line 50.

The desired recovery and purification of vinyl chloride vapors from the gaseous mixture from polyvinyl chloride reactors are accomplished, in accordance with the practice of the present invention, under operating conditions of pressure and temperature such as to facilitate the desired selective absorption, recovery and purification of vinyl chloride. As indicated above, the gaseous mixture to be treated is compressed so as to enter the absorption zone at a pressure generally within the range of from about 25 psig to about 100 psig, with a pressure on the order of from about 40 psig to about 50 psig being generally preferred. The gaseous mixture thus compressed is passed to the absorption zone at a temperature generally of from about 10°C to about 40°C, the liquid lactam composition in the absorption zone being maintained at a temperature within the range of from about 20°C to about 40°C. As hereinabove indicated, the presence of water in the system can be tolerated and serve to facilitate the overall operation of the invention, with the liquid lactam solvent composition in the absorption zone comprising an aqueous solution having generally from about 2% to about 10% by weight water based on the total weight of said composition with a water content of about 5 % by weight being generally preferred. The gaseous mixture to be treated will commonly have a small water vapor content upon entering the absorption zone, as for example about 1- by volume based on the total volume of said gaseous mixture. It will be understood that the stripper zone will generally be operated at about the same or only slightly less pressure than is employed in the absorption zone. The solvent recovery still, on the other hand, will generally be operated at a lower pressure, i.e., on the order of from about 5 psig to about 20 psig, with a corresponding temperature to achieve the desired stripping of the vinyl chloride vapors from the lactam composition.

In an illustrative example of an embodiment of the invention, vinyl chloride-containing vapors were vented from polyvinyl chloride reactors and passed to an atmospheric gas-holder accumulator, into which inert nitrogen purge gas was also passed to produce a uniform composition comprising essentially equal proportions of the desired vinyl chloride and the nitrogen purge gas together with minor amounts of vaporous impurities including methyl chloride, butadiene, acetylene, acetaldehyde, as well as sulfur, hydrogen chloride and non-volatiles. The proportions of such components in the gaseous mixture were as set forth above in the recitation of a typical gaseous mixture composition from polyvinyl chloride reactor venting and purging. The gaseous mixture was compressed to about 45 psig and cooled to about 32°C. Following passage through a water knock-out tank, the treated gas at the indicated temperature and pressure was passed into the absorber cooler section of an absorption column for passage upwardly through the absorption column in counter-current contact with a descending stream of liquid lactam solvent. The solvent, namely N-methyl pyrrolidone, is at a temperature of about 30°C and has a water content of about 5% by weight, based on the total weight of the liquid lactam solvent composition.

Upon contact with the liquid lactam solvent composition in the absorption zone, which comprises a packed column, the vinyl chloride vapors are selectively absorbed, while essentially all of the inert purge gas, and the acetylene, butadiene and methyl chloride impurities present in the gaseous mixture pass through the absorption zone into the residue gas stream exhausted therefrom. In order to prevent an undesired loss of the lactam solvent vaporized or entrained in the residue gas stream, the gaseous mixture being treated is passed upward from the absorption zone directly into a water scrubber zone for counter-current contact with a small stream of water to recover any such vaporized or entrained lactam solvent from the treated gas stream. The residue gas stream can thus be discharged to the stack with essentially all of the vinyl chloride content of the initial gaseous mixture to be treated stripped therefrom in the absorption zone and with essentially all of the lactam vaporized or entrained therein during passage through the absorption zone being stripped therefrom during passage through the scrubber zone. The residue gas is thus discharged to the stack with the following composition as shown in Table II:

TABLE II

| Component | Pound Moles Per Day |
|---|---|
| Nitrogen | 97.654 |
| Acetylene | 0.00004 |
| Butadiene | 0.00063 |
| Methyl Chloride | 0.0063 |
| Vinyl Chloride | 4.5 |
| Water | 1.03 |
| Other Impurities | Trace |

A rich lactam solvent liquid stream having vinyl chloride absorbed therein is passed at 90°F to a stripping zone maintained at 45 psig, wherein a descending stream of said rich solvent is contacted with stripper reboiler vapors introduced into the bottom of the stripping column or zone at a temperature of about 205°F. As the stripper reboiling vapors, which are essentially vinyl chloride vapors, pass through the stripping column as an ascending vaporous stream, said reboiler vapors strip most of the lighter vapor impurities that may be present in the rich liquid solvent stream. The vapor impurities thus stripped and removed from the upper portion of the stripping column are recycled to the absorption zone. This vapor impurity recycle stream, which is at 90°F, contains very little vinyl chloride stripped from the rich solvent since the stripping agent itself is vinyl chloride.

The thus stripped rich lactam liquid stream is passed from the stripping column into the stripping column reboiler wherein the rich lactam stream is heated by steam to form the stripper reboiler vapors that are introduced into the bottom of the stripper column at 205°F. The stripper bottoms withdrawn from the reboiler as a liquid stream at 205°F comprise the N-methyl pyrrolidone lactam solvent, together with absorbed vinyl chloride, and sulfur, non-volatile materials such as salts, rust, scale, and the like. Any acetaldehyde absorbed from the gaseous mixture by the N-methyl pyrrolidone liquid lactam solvent is also present in the stripper bottoms liquid stream. The stripper bottoms are then passed through heat exchange with regenerated liquid lactam solvent from the solvent still and through other suitable pre-heaters for entry into the solvent still maintained at 10 psig. The composition of the stripper bottoms introduced into the solvent still are set forth in Table III as follows:

TABLE III

| Component | Concentration (pound moles per day) |
|---|---|

| | |
|---|---|
| Nitrogen | |
| Acetylene | |
| Butadiene | 0.00007 |
| Methyl chloride | 0.0007 |
| Vinyl chloride | 95.5 |
| Water | 112.0 |
| Other impurities | 0.01034 |
| N-Methyl pyrrolidone | 387.5 |

Regenerated liquid lactam withdrawn from the bottom of the solvent still and passes to the solvent still reboiler for heating therein with steam to produce vinyl chloride vapors that pass from the reboiler at 325°F for introduction into the bottom portion of the solvent still. Regenerated liquid lactam solvent is withdrawn from the reboiler for heat exchange with the stripper bottoms stream, as indicated above, and passage to a solvent storage tank for recycle to the absorption zone. A 5% side stream is removed from the regenerated liquid lactam stream from the reboiler for passage to a solvent purifier for steam stripping therein, the steam stripped lactam solvent being introduced back into the solvent still. About a pound of caustic form of sodium hydroxide is added to this side stream for control of HCl. Sulfur, sodium chloride, non-volatile and heavy ends are drained from the solvent purifier, thus preventing the gradual accumulation of such impurities in the system.

Vinyl chloride vapors and water vapor are withdrawn from the upper portion of the solvent still and are air cooled, e.g., to 140°F, in a reflux condenser, the partially condensed stream therefrom being passed to a reflux accumulator. Condensate comprising essentially of water is recycled from the reflux accumulator as reflux to the solvent still. A vapor stream containing the desired vinyl chloride vapors is withdrawn from the reflux accumulator and is compressed and cooled, as to about 64 psig and 90°F to condense the vinyl chloride vapors and water. The condensate thus formed is passed to a product accumulator tank, from which water and the desired liquid vinyl chloride product can be separately withdrawn. The recovered vinyl chloride product will have the following composition as shown in Table IV:

TABLE IV

| Component | Concentration (pound moles per day) |
|---|---|
| Nitrogen | |
| Acetylene | |
| Butadiene | 0.00007 |
| Methyl chloride | 0.0007 |
| Vinyl chloride | 95.5 |
| Water | 0.91 |
| Other impurities | Trace* |
| N-Methyl pyrrolidone | None |

*0.2 parts per million acetaldehyde

The present invention thus permits vinyl chloride vapors vented and purged from polyvinyl chloride reactors to be separated and recovered from the inert purge gas and a substantial portion of the impurities vented and purged from the reactors therewith. In the illustrative example above, a liquid vinyl chloride product having a purity of more than 99% is obtained. In addition, this high purity vinyl chloride product constitutes a substantial portion of the vinyl chloride originally present in the gaseous mixture fed to the absorption zone. The vinyl chloride content of the gas discharged from the absorption column will generally contain not more than about 5% by weight of the total vinyl chloride content of the gas stream to be treated. The recovered vinyl chloride product of high purity will, therefore, generally contain at least about 95% of said total vinyl chloride content, rendering the present invention highly effective and significant both in terms of the purity of the recovered vinyl chloride and the total recovery achieved.

The recovery of a high quality vinyl chloride product from the exhaust vapors from polyvinyl chloride reactors represents a significant aspect of the overall polyvinyl chloride production operation. In the practice of the present invention, the essentially complete recovery of vinyl chloride in the form of a high quality product is achieved in a commercially feasible manner utilizing a N-alkyl lactam solvent that can readily be regenerated for subsequent use in the treatment of additional quantities of the gaseous mixture containing desired vinyl chloride vapors. The present invention, therefore, is highly suitable for use in the recovery of vinyl chloride vapors vented and purged from polyvinyl chloride reactors being withdrawn from production operation service on either a predetermined schedule at uniform intervals or on a more random basis, requiring in any event the venting of the vinyl chloride vapors from the reactors as each reactor comes off service.

Therefore, I claim:

1. A method for recovering vinyl chloride vapors from a gas stream comprising:
   a. contacting said vinyl chloride-containing gas stream to be treated with an N-alkyl lactam liquid solvent composition in an absorption zone maintained at a liquid temperature of from about 20°C to about 40°C, said liquid solvent composition containing from about 2% to about 10% by weight water, based on the total weight of said liquid solvent composition, said gas stream being introduced into the absorption zone at a pressure of from about 25 psig to about 100 psig and a gas temperature of from about 10°C to about 40°C; and
   b. exhausting the gas stream from said absorption zone, said gas stream having a substantial portion of its vinyl chloride content removed therefrom, whereby the N-alkyl lactam effectively absorbs vinyl chloride vapors from the gas stream for subsequent recovery and use.

2. The method of claim 1 in which said gas stream to be treated comprises vinyl chloride vapor and inert gas.

3. The method of claim 2 in which said gas stream introduced into the absorption zone is at a pressure of from about 40 psig to about 50 psig.

4. The method of claim 1 in which the water content of the solvent composition is about 5% by weight, based on the total weight of said composition.

5. The method of claim 1 in which the N-alkyl lactam comprises N-methyl pyrrolidone.

6. The method of claim 1 in which said N-alkyl lactam comprises N-cyclohexyl pyrrolidone.

7. The method of claim 5 in which said gas stream to be treated comprises about equal proportions vinyl chloride vapor and inert gas, said gas stream extracted from the contacting zone containing less than about 5% by weight vinyl chloride.

8. The method of claim 1 and including passing solvent having vinyl chloride absorbed therein from said absorption zone to a distillation zone and therein distilling said solvent under reflux conditions to strip vinyl chloride vapors therefrom.

9. The method of claim 8 and including recycling lactam solvent from the distillation zone to the absorption zone for contact with additional quantities of said gas to be treated.

10. The method of claim 9 and including condensing vinyl chloride vapors passing from said distillation zone and recovering condensate thereof as an essentially pure, liquid vinyl chloride product.

11. The method of claim 10 in which the N-alkyl lactam comprises N-methyl pyrrolidone.

12. The method of claim 11 in which the gas stream introduced to the absorption zone is at a pressure of from about 40 psig to about 50 psig.

13. The process of claim 1 and including passing the gas stream exhausted from the absorption zone through a scrubber zone for contact with water therein to recover vaporized or entrained lactam solvent contained in said gas stream exhausted from the absorption zone.

14. The process of claim 10 and including passing the gas stream exhausted from the absorption zone through a scrubber zone for contact with water therein to recover vaporized or entrained lactam solvent contained in said gas stream exhausted from the absorption zone.

15. The process of claim 14 in which said lactam solvent comprises N-methyl pyrrolidone.

16. The process of claim 15 in which the gas stream introduced into the absorption zone is at a pressure of from about 40 psig to about 50 psig.

17. A method for recovering and purifying vinyl chloride present in vapors vented from a polyvinyl chloride reactor comprising:
   a. passing said vented vapors, together with inert purge gas, from a polyvinyl chloride reactor to an accumulator zone, the gases therein forming a vinyl chloride-containing gas stream to be treated, said gas stream containing vinyl chloride, inert gas and minor amounts of vapor impurities taken from the group consisting of acetylene, hydrogen chloride, butadiene, methyl chloride, acetaldehyde and mixtures thereof, together with sulfur and non-volatile impurities;
   b. contacting said gas stream to be treated with an N-alkyl lactam liquid solvent composition in an absorption zone maintained at a liquid temperature of from about 20°C to about 40°C, said liquid solvent containing from about 2% to about 10% water by weight, based on the total weight of said solvent composition, said gas stream being introduced into the contacting zone at pressure of from about 25 psig to about 100 psig and a gas temperature of from about 10°C to about 40°C;
   c. exhausting a residue gas stream from the absorption zone, said gas stream containing the inert purge and acetylene vapor impurities and essentially all of the butadiene and methyl chloride vapor impurities in the initial gas stream to be treated, said residue gas stream also containing minor amounts of water vapor and vinyl chloride vapors, essentially all of the vinyl chloride vapors present in the initial gas stream to be treated, together with any acetaldehyde and hydrogen chloride vapor impurities, sulfur and non-volatile impurities being recovered from said gas stream to be treated by the lactam solvent in said absorption zone;
   f. passing a rich liquid lactam solvent stream from the absorption zone to a vapor impurity stripping zone wherein the lactam solvent is contacted with vinyl chloride vapors to strip volatile vapor impurities present in said lactam solvent stream therefrom, said vinyl chloride vapors being obtained by reboiling liquid stripper bottoms withdrawn from the stripping zone in a stripper bottoms reboiling zone;
   e. recycling said vapor impurities together with vinyl chloride vapor to the absorption zone for contact with said liquid solvent, said vinyl chloride vapor constituting a portion of the vinyl chloride passed to said stripping zone in the rich lactam solvent stream fed to said stripping zone from the absorption zone;
   f. passing a stripper bottoms liquid stream from said stripper bottoms reboiling zone to a distillation zone, said stripper bottoms comprising a liquid lactam solvent and water composition having vinyl chloride dissolved therein, accompanied by any acetaldehyde, hydrogen chloride, sulfur and non-volatile impurities present in the rich lactam solvent stream withdrawn from the absorption zone;
   g. distilling said stripper bottoms under reflux conditions to strip said vinyl chloride therefrom; and
   h. recovering vinyl chloride vapors removed from said distillation zone, said vinyl chloride being essentially free of the impurities vented from the polyvinyl chloride reactor and purge gas associated therewith, said vinyl chloride vapors being accompanied by water vapor, any acetaldehyde impurities present in the gas stream to be treated, and the minor amount of butadiene and methyl chloride impurities not absorbed from said gas stream to be treated by said N-alkyl lactam solvent, whereby vinyl chloride vapors in the gas stream to be treated are effectively recovered by absorption in the N-alkyl lactam solvent, said vinyl chloride being essentially purified from admixture with the impurities associated therewith in the gas stream being treated and recovered as a high purity vinyl chloride product.

18. The method of claim 17 in which said N-alkyl lactam comprises N-methyl pyrrolidone.

19. The method of claim 18 in which said gas stream introduced into the absorption zone is at a pressure of from about 40 psig to about 50 psig.

20. The method of claim 19 in which the water content of the liquid solvent composition is about 5% by weight, based on the total weight of said solvent composition.

21. The process of claim 17 and including recycling liquid lactam solvent from the distillation zone to the absorption zone.

22. The method of claim 21 and including condensing vinyl chloride vapors passing from said distillation zone and recovering the condensate as an essentially pure, liquid vinyl chloride product.

23. The process of claim 21 and including passing the gas stream exhausted from the absorption zone through a scrubber zone for contact with water therein to recover lactam solvent vaporized or entrained in said gas stream, the gas stream discharged from said scrubbing zone having essentially all of its lactam solvent content removed therefrom in the scrubber zone.

24. The process of claim 23 in which said N-alkyl lactam comprises N-methyl pyrrolidone.

25. The process of claim 23 and including steam stripping, in a solvent purification zone, a side stream constituting a portion of the liquid lactam solvent stream passed from the distillation zone, said steam stripped lactam being returned to said distillation zone, with a waste liquid stream containing any non-volatile material, hydrogen chloride and sulfur contained in said side stream being drained from said purification zone, thereby precluding the gradual accumulation of said non-volatiles, hydrogen chloride and sulfur in the lactam solvent stream recycled to the absorption zone.

26. The process of claim 25 in which said portion of the lactam solvent stream stripped in said solvent purification zone comprises up to about 5% of the total lactam solvent stream passed from said distillation zone.

27. The process of claim 26 and including adding a small amount of caustic to the side stream passed to the purification zone to neutralize any HCl absorbed in the lactam solvent, minimizing any corrosive effect resulting from the presence of such HCl in said lactam solvent.

28. The process of claim 25 in which said lactam solvent comprises N-methyl pyrrolidone.

29. The process of claim 28 and including condensing vinyl chloride vapors passing from said distillation zone and recovering an essentially pure, liquid vinyl chloride condensate product.

30. The process of claim 29 in which said vinyl chloride liquid product comprises at least about 99% vinyl chloride by weight, the vinyl chloride content of the gas discharged from the scrubber zone being not more than about 5% by weight of the vinyl chloride in the gas stream passed to the absorption zone, a substantial portion of the vinyl chloride thus being recovered and purified for subsequent use.

* * * * *